US005541457A

United States Patent [19]

Morrow

[11] Patent Number: 5,541,457

[45] Date of Patent: Jul. 30, 1996

[54] ELECTRICAL CURRENT ACTUATED ACCESSORY OUTLET

[76] Inventor: Rodney J. Morrow, 20611 16th Ave., Court E., Spanaway, Wash. 98387

[21] Appl. No.: 489,671

[22] Filed: Jun. 12, 1995

[51] Int. Cl.[6] .......... H02J 3/14

[52] U.S. Cl. .......... 307/38; 307/11; 307/39; 307/41; 307/126; 307/139; 307/12; 361/166; 361/191

[58] Field of Search .......... 307/18, 112, 114, 307/115, 38, 11, 12, 41, 116, 139, 140, 126, 39, 126; 361/166, 191

[56] References Cited

U.S. PATENT DOCUMENTS

| | | | |
|---|---|---|---|
| 3,416,001 | 9/1967 | Fistell | 307/38 |
| 4,659,941 | 4/1987 | Quiros et al. | 307/11 |
| 5,099,157 | 3/1992 | Meyer | 327/456 |
| 5,384,490 | 1/1995 | Swartz | 307/38 |
| 5,424,903 | 6/1995 | Schreiber | 361/166 |

*Primary Examiner*—William M. Shoor, Jr.
*Assistant Examiner*—Albert W. Paladini

[57] ABSTRACT

An electrical current actuated accessory outlet including a power cable receiving mechanism removably securable to a remote electrical power receptacle for receiving a source of alternating current therefrom; and an electric circuit including an electrical receptacle coupled to the power cable receiving mechanism and having an accessory outlet and a tool outlet for delivering the source of alternating current, and a power switching mechanism coupled between the outlets of the receptacle and the power cable receiving mechanism and with the power switching mechanism having an activated mode for automatically allowing alternating current to be drawn from the auxiliary outlet by an auxiliary electrical device when alternating current is being drawn from the tool outlet by an electrical tool secured thereto.

5 Claims, 4 Drawing Sheets

ELECTRICAL CURRENT ACTUATED ACCESSORY OUTLET

BACKGROUND OF THE INVENTION

1. Field of the Invention

The present invention relates to an electrical current actuated accessory outlet and more particularly pertains to allowing an electrical auxiliary device such as a shop vacuum to be operated simultaneously and automatically in connection with an electrical tool such as a saw with an electrical current actuated accessory outlet.

2. Description of the Prior Art

The use of current controlled switches is known in the prior art. More specifically, current controlled switches heretofore devised and utilized for the purpose of providing a switchable source of electrical current are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,631,257 to Behr discloses an automatic power switching unit. U.S. Pat. No. 3,702,435 to Endo et al. discloses an electric power control device. U.S. Pat. No. 4,727,225 to Jones discloses an electrical switch for actuating a plurality of circuits. U.S. Pat. No. 4,905,115 to Whidden et al. discloses an automatic and manual DC power switch. U.S. Pat. No. 5,103,111 to Tobin et al. discloses a switch configuration with integral sensing and power supply apparatus.

While these devices fulfill their respective, particular objective and requirements, the aforementioned patents do not describe an electrical current actuated accessory outlet that has one mode of operation that allows an auxiliary electric device secured thereto to be operated as a slave to an electric tool secured thereto and further has another mode of operation that allows the auxiliary electric device secured thereto to be operated independently of the electric tool secured thereto.

In this respect, the electrical current actuated accessory outlet according to the present invention substantially departs from the conventional concepts and designs of the prior art, and in doing so provides an apparatus primarily developed for the purpose of allowing an electrical auxiliary device such as a shop vacuum to be operated simultaneously and automatically in connection with an electrical tool such as a saw.

Therefore, it can be appreciated that there exists a continuing need for new and improved electrical current actuated accessory outlet which can be used for allowing an electrical auxiliary device such as a shop vacuum to be operated simultaneously and automatically in connection with an electrical tool such as a saw. In this regard, the present invention substantially fulfills this need.

SUMMARY OF THE INVENTION

In the view of the foregoing disadvantages inherent in the known types of current controlled switches now present in the prior art, the present invention provides an improved electrical current actuated accessory outlet. As such, the general purpose of the present invention, which will be described subsequently in greater detail, is to provide a new and improved electrical current actuated accessory outlet and method which has all the advantages of the prior art and none of the disadvantages.

To attain this, the present invention essentially comprises, in combination, a rigid device box having an open top and a cover removably secured over the top. A sheathed power cable is included and has a positive lead, a neutral lead, a proximal terminal end extended within the housing, and a distal three-pronged polarized grounded plug end extended from the housing and securable to a polarized grounded socket of an electrical receptacle of a remote electrical power source for receiving a source of alternating current therefrom.

An electric circuit is included and disposed within the device box. The electric circuit includes a first power transformer having a primary coil and a secondary coil and with the primary coil thereof coupled to the positive lead of the power cable for receiving the source of alternating current. The electric circuit includes an electrical receptacle having a three-pronged polarized grounded accessory outlet and a three-pronged polarized grounded tool outlet with each outlet further extended outwards through the cover of the device box. The accessory outlet is mateable with a plug end of an electrical accessory device and the tool outlet is mateable with a plug end of the electrical tool. The accessory outlet is coupled to the neutral lead of the power cable and the tool outlet is coupled to the primary coil of the first power transformer and the neutral lead of the power cable.

The electric circuit includes a first full wave rectifier formed of two diodes for transforming the source of alternating current into a first source of direct current. Each diode of the first rectifier has a positive end and a neutral end. The positive ends of the diodes are coupled to the secondary coil of the first transformer and the neutral ends of the diodes coupled together at a common junction. Each diode further has a resistor and a capacitor coupled in parallel therewith for mitigating fluctuations in the first source of direct current. The electric circuit includes a second power transformer having a primary coil and a secondary coil and with the primary coil thereof coupled to the positive lead and the neutral lead of the power cable. The electric circuit includes a second full wave bridge rectifier formed of four interconnected diodes for transforming the source of alternating current into a second source of direct current. The second rectifier has a capacitor coupled in parallel therewith for mitigating fluctuations in the second source of direct current. The electric circuit includes a first relay having a switching coil coupled to the second rectifier and a pair of switching contacts coupled between the positive lead of the power cable and the accessory outlet of the electrical receptacle. The switching contacts of the first relay further have a capacitor coupled in parallel therewith for reducing current arcing during switching.

The electric circuit includes a second relay having a switching coil coupled to the common junction of the second rectifier and a pair of switching contacts coupled between the switching coil thereof and the switching coil of the first relay. The electric circuit includes a power transistor having a gate terminal coupled to the common junction of the first wave rectifier, a drain terminal coupled to one of the switching contacts of the second relay, and a source terminal coupled to the switching coil of the first bridge rectifier. Lastly, the electric circuit includes a single pull single throw switch coupled in parallel with the switching contacts of the first relay. The switch has a toggleable portion extended outwards from the cover of the device box. The switch has an open orientation for allowing the source of alternating current to be delivered to the tool that is plugged into the tool outlet and to thus cause the sources of direct current to flow through the transistor and effect closure of the switching contacts of the first relay, thereby allowing delivery of the source of alternating current to the auxiliary device that is plugged into the accessory outlet. The switch further has a closed orientation for allowing the source of alternating current to be delivered to the accessory outlet for operation of the auxiliary device independently of the operation of the tool that is plugged into the tool outlet.

There has thus been outlined, rather broadly, the more important features of the, invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electrical current actuated accessory outlet which has all the advantages of the prior art current controlled switches and none of the disadvantages.

It is another object of the present invention to provide a new and improved electrical current actuated accessory outlet which may be easily and efficiently manufactured and marketed.

It is a further object of the present invention to provide a new and improved electrical current actuated accessory outlet which is of durable and reliable construction.

An even further object of the present invention is to provide a new and improved electrical current actuated accessory outlet which is susceptible of a low cost of manufacture with regard to both materials and labor, and which accordingly is then susceptible of low prices of sale to the consuming public, thereby making such an electrical current actuated accessory outlet economically available to the buying public.

Still yet another object of the present invention is to provide a new and improved electrical current actuated accessory outlet which provides in the apparatuses and methods of the prior art some of the advantages thereof, while simultaneously overcoming some of the disadvantages normally associated therewith.

Even still another object of the present invention is to provide a new and improved electrical current actuated accessory outlet for allowing an electrical auxiliary device such as a shop vacuum to be operated simultaneously and automatically in connection with an electrical tool such as a saw.

Lastly, it is an object of the present invention to provide a new and improved electrical current actuated accessory outlet comprising power cable receiving means removably securable to a remote electrical power receptacle for receiving a source of alternating current therefrom; and an electric circuit including an electrical receptacle coupled to the power cable receiving means and having an accessory outlet and a tool outlet for delivering the source of alternating current, and power switching means coupled between the outlets of the receptacle and the power cable receiving means and with the power switching means having an activated mode for automatically allowing alternating current to be drawn from the auxiliary outlet by an auxiliary electrical device when alternating current is being drawn from the tool outlet by an electrical tool secured thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
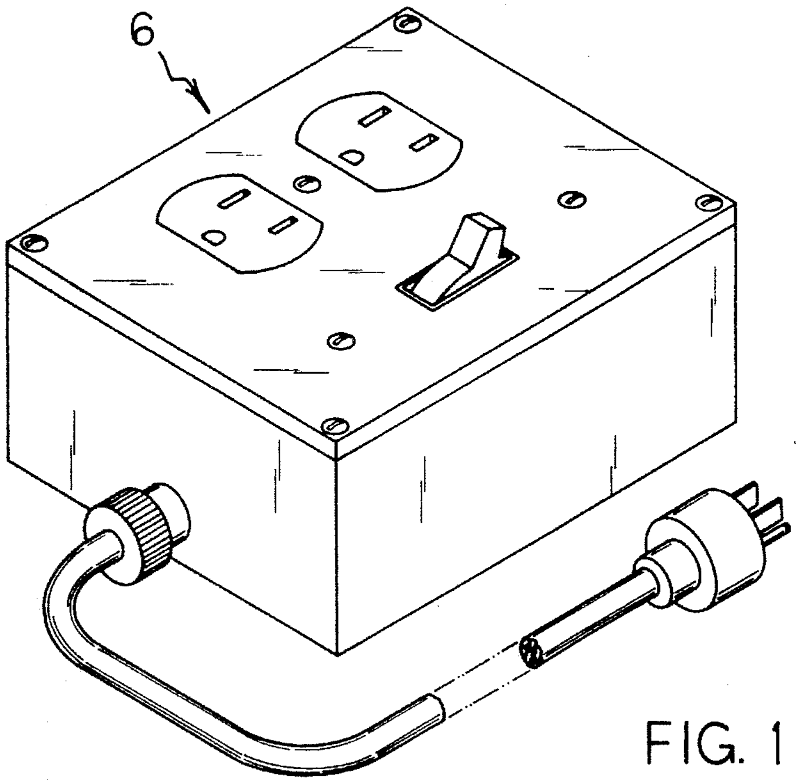
FIG. 1 is a perspective view of the preferred embodiment constructed in accordance with the principles of the present invention.

With reference now to the drawings, and in particular, to FIG. 1 thereof, the preferred embodiment of the new and improved electrical current actuated accessory outlet embodying the principles and concepts of the present invention and generally designated by the reference number 6 will be described.

The preferred embodiment of the present invention comprises a plurality of components. In their broadest context, such components include a device box, a power cable, and an electric circuit. Such components are individually configured and correlated with respect to each other to provide the intended function of allowing an electrical auxiliary device such as a shop vacuum 7 to be operated simultaneously and automatically in connection with an electrical tool 8 such as a saw in one mode of operation. In addition, the present invention allows the auxiliary device to be operated independently of the tool in another mode of operation.

Specifically, the present invention includes a rigid device box 10. The device is formed of a plastic material and has an open top 10A. The device box also has a cover 11 removably secured over the top with screws 10B.

Also included is a sheathed power cable 13. The power cable has a positive lead 13A and a neutral lead 13B. In addition, the power cable has a proximal terminal end extended within the device box 10 and a distal 3-pronged polarized grounded plug end 14 extended from the device box. The plug end 14 is securable to a polarized grounded socket of an electrical receptacle of a remote electrical power source. The power cable is used for receiving a source of alternating electric current from the remote electrical power source.

Figure 6:
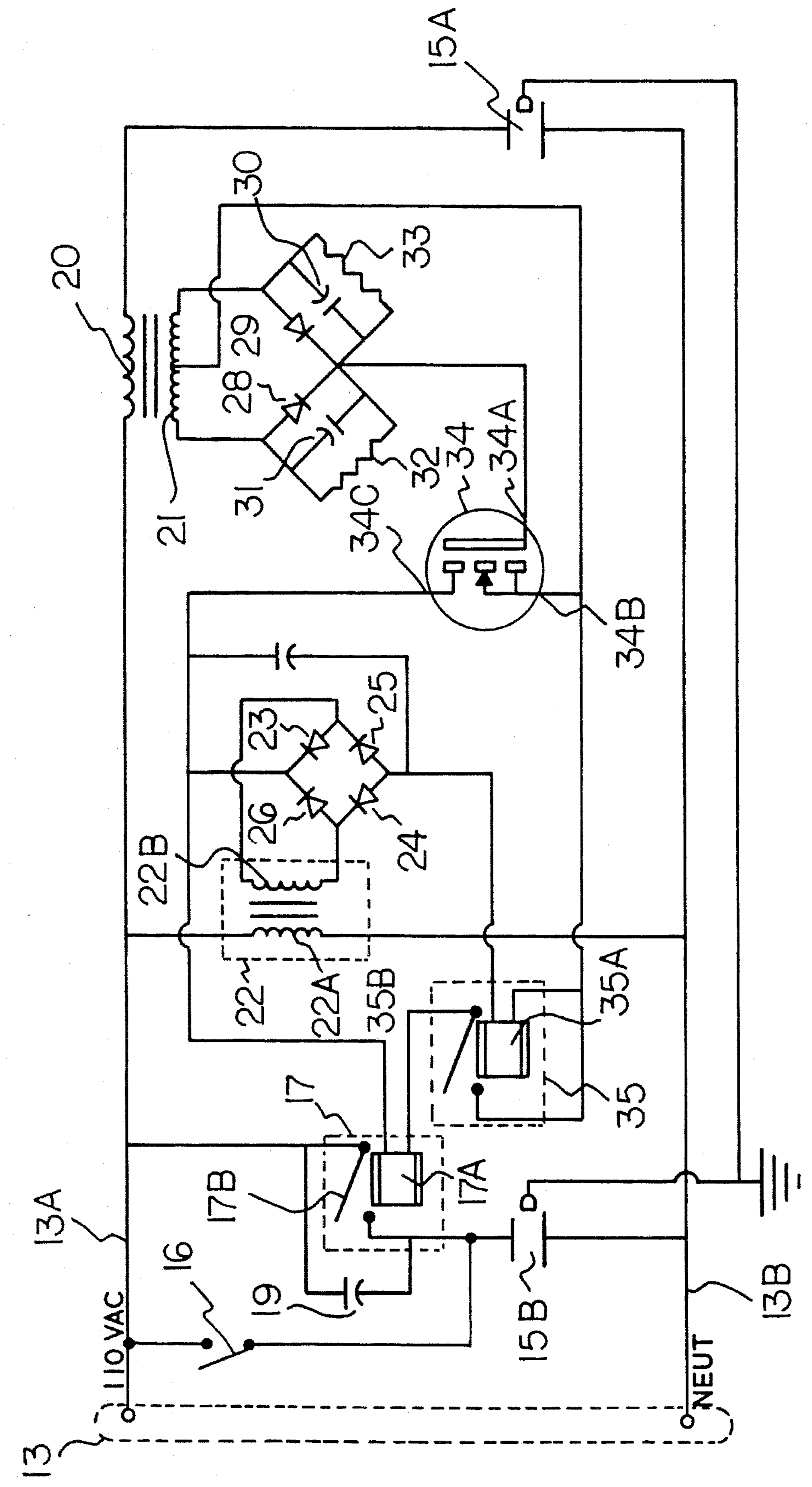
FIG. 6 is a schematic diagram depicting the interconnection of the electrical components of the present invention.

The present invention is operable through an electric circuit as shown in FIG. 6. The electric circuit is disposed within the device box 10. The electric circuit is formed of conventional electric components. A first power transformer 20 is included. The power transformer has a primary coil 20 and a secondary coil 21. The primary coil 20 of the first power transformer is coupled to the positive lead 13A of the power cable 13. The first power transformer is used for receiving and then subsequently stepping down the source of alternating current. An electrical receptacle 15 is also included. The electrical receptacle has a three-pronged polarized grounded accessory outlet 15B and a three-pronged polarized grounded tool outlet 15A. Each outlet is extended outwards through the cover and through apertures 11A. The accessory outlet 15B is mateable with a plug end of the electrical accessory device 7. The tool outlet is mateable with a plug end of the electrical tool 8. The accessory outlet 15B is coupled to the neutral lead 13B of the power cable. The tool outlet 15A is coupled to the primary coil 20 of the first power transformer and the neutral lead 13B of the power cable.

A first full-wave rectifier formed of two diodes 28, 29 is used for transforming the source of alternating current from the remote power source into a first source of direct current. Each diode 28, 29 of the first rectifier has a positive end and a neutral end. The positive end of each diode 28 and 29 is coupled to a separate end of the secondary coil 21 of the first transformer. The neutral ends of the diodes 28, 29 are coupled together at a common junction. Diode 28 has a resistor 31 and a capacitor 32 coupled in parallel therewith. Similarly, diode 29 has a resistor 33 and a capacitor 30 coupled in parallel therewith. The resistors 32, 33 and capacitors 30, 31 are used in conjunction with the diodes for mitigating fluctuations in the first source of rectified direct current.

Also provided is a second power transformer 22. The second power transformer has a primary coil 22A and a secondary coil 22B. The primary coil 22A is coupled to the positive lead 13A and the neutral lead 13B of the power cable. A second full wave bridge rectifier is coupled to the secondary coil 22B of the second transformer. The second rectifier is formed of four series-interconnected diodes 23, 24, 25, and 26 and is used for transforming the source of alternating current from the remote power source into a second source of direct current. The second rectifier also includes a capacitor 27 coupled in parallel therewith. Capacitor 27 is used for mitigating fluctuations in the second source of rectified direct current.

A first relay 17 is provided and has a switching coil 17A and a pair of switching contacts 17B. Switching coil 17A is coupled to the second rectifier. Switching contacts 17B are coupled between the positive lead 13A of the power cable and the accessory outlet 15B of the electrical receptacle 15. The switching contacts 17B of the first relay 17 include a capacitor 19 coupled in parallel therewith. Capacitor 19 is used for reducing arcing during switching of contacts 17B.

Working in conjunction with the first relay is a second relay 35. The second relay 35 has a switching coil 38 coupled to the common junction of the second rectifier. Relay 35 also has a pair of switching contacts 35B coupled between the switching coil 35A thereof and the switching coil 17A of the first relay 17.

A metal oxide semiconductor field effect transistor (MOS-FET) 34 is used for controlling electronic communication between the relays 17, 35. The transistor 34 has a gate terminal 34A coupled to the common junction of the first wave rectifier, a drain terminal 34B coupled to one of the switching contacts 35B of the second relay, and a source terminal 34C coupled to the positive terminal of the second bridge rectifier.

Lastly, a manually actuated single pull single throw switch 16 is coupled in parallel with the switching contacts 17B of the first relay 17. Switch 16 has a toggleable portion 16A extended outwards through the cover via aperture 16B. The switch 16 has an open orientation for allowing the source of alternating current to be delivered to the tool 8 that is plugged into the tool outlet 15A. When the tool 8 is plugged into the tool outlet 15A and actuated, the sources of direct current flow through the transistor 34 to effect closure of the switching contacts 17B of the first relay 17 and thereby allow delivery of the source of alternating current to the auxiliary device 7 that is plugged into the accessory outlet 15B. The switch 16 further has a closed orientation for allowing the source of alternating current to be delivered to the accessory outlet 15B for operation of the auxiliary device 7 independently of the operation of the tool 8 that is plugged into the tool outlet 15A.

The present invention is an enclosure of plastic or metal material in the form of a device box 10 with cover 11 containing electrical and electronic components which connect two electrical current drawing devices to a power source and further provide automatic and simultaneous or independent operation of the electrical current drawing devices from a common power source. This invention relates to automatic control of electrical equipment and specifically, to devices that control the on and off function of dust collection equipment that is operated in conjunction with dust, chip, and airborne particle producing machines and equipment. The primary intended use of this invention is to allow a dust chip, or airborne particle collection system such as a shop vacuum to be operated simultaneously and automatically in conjunction with a dust, chip or particle producing power tool or machine such as a saw, sander, router, etc.

Large machines such as those used in commercial and industrial shops are equipped with electrical contractors which apply power to the machine when the operator turns on the machine switch. These electrical contractors have extra contacts built in which are also closed when the machine is switched on by the operator. These extra contacts in turn apply power to an installed dust collection system. Small hand-held power tools do not come equipped with such provisions as extra contacts or auxiliary switches. Therefore, it is necessary for the operator of these tools to switch a dust collection system on and off manually. Doing this is both inconvenient and time consuming. The present invention makes using electrical devices in relation to a hobby such as woodworking both cleaner and safer.

Figure 4:
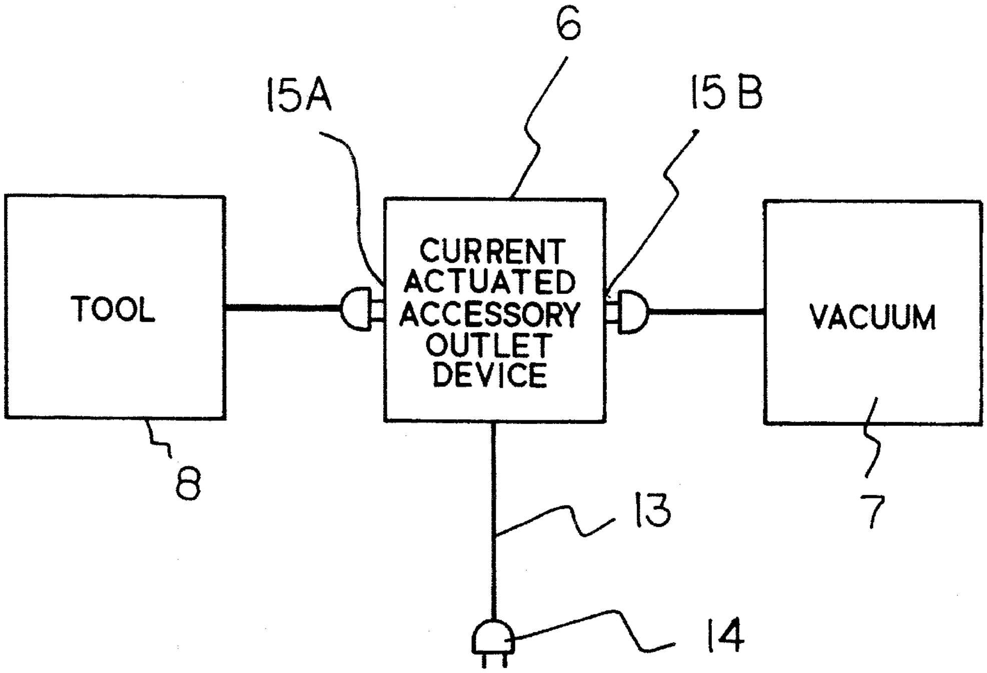
FIG. 4 is a block diagram depicting the interconnection of the present invention to a tool and a vacuum for providing alternating current.

As illustrated in FIG. 4, the present invention is utilized by first connecting it with a 120 VAC power source via the power cord 13, connecting a plug of electrical tool or machine to be used to the tool outlet, and then connecting a plug end of an auxiliary device such as to a dust collection system to the accessory outlet. Through use of the present invention, the same automatic on/off operation as provided by a large and permanently installed current switching system can be duplicated.

Since the purpose of this invention is to allow automatic and simultaneous operation of a dust collection system in conjunction with a dust, chip, and/or airborne-particle producing power tool or machine, the first step is to connect a plug end of a dust producing tool or machine to this invention via the tool outlet represented by the number 15A in FIG. 1. Next, a plug end of a dust collection system is connected to the accessory outlet 15B. This invention must then be connected to a 120 volt power source via the power cord 13. Now, the on/off switch of the dust collection system is placed in the "on" position to allow for its automatic activation when the electric power tool is activated. The present invention is now ready to operate. The dust collection system will now follow the on/off operation of the dust producing tool or machine simultaneously and automatically.

Figure 2:
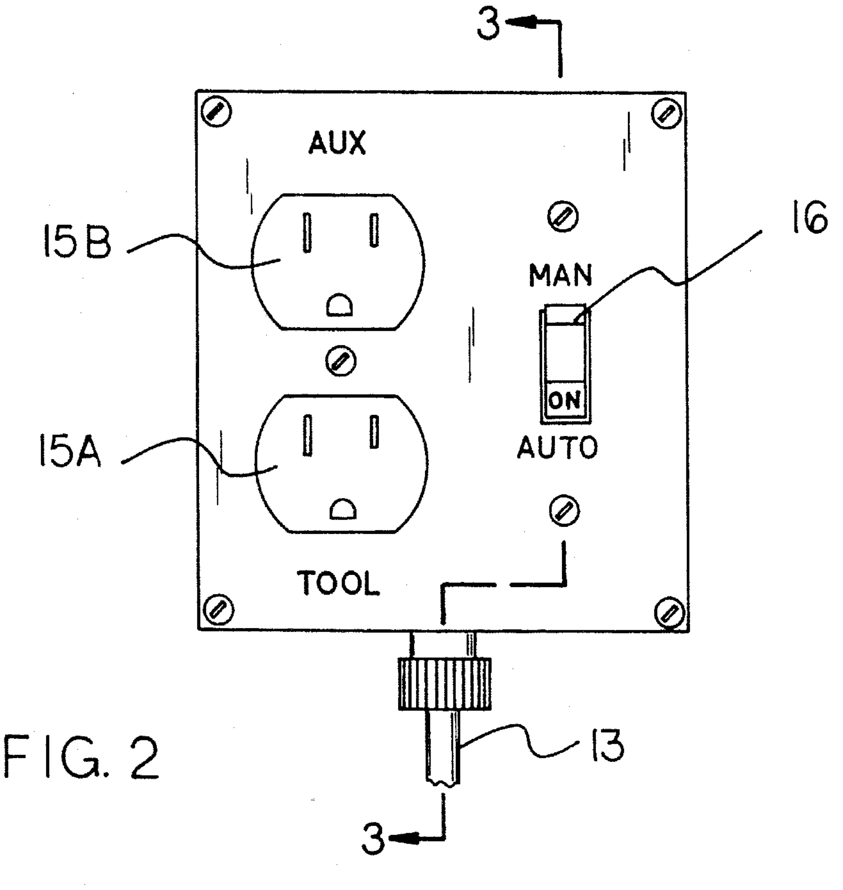
FIG. 2 is a plan view of the housing of the present invention.
Figure 3:
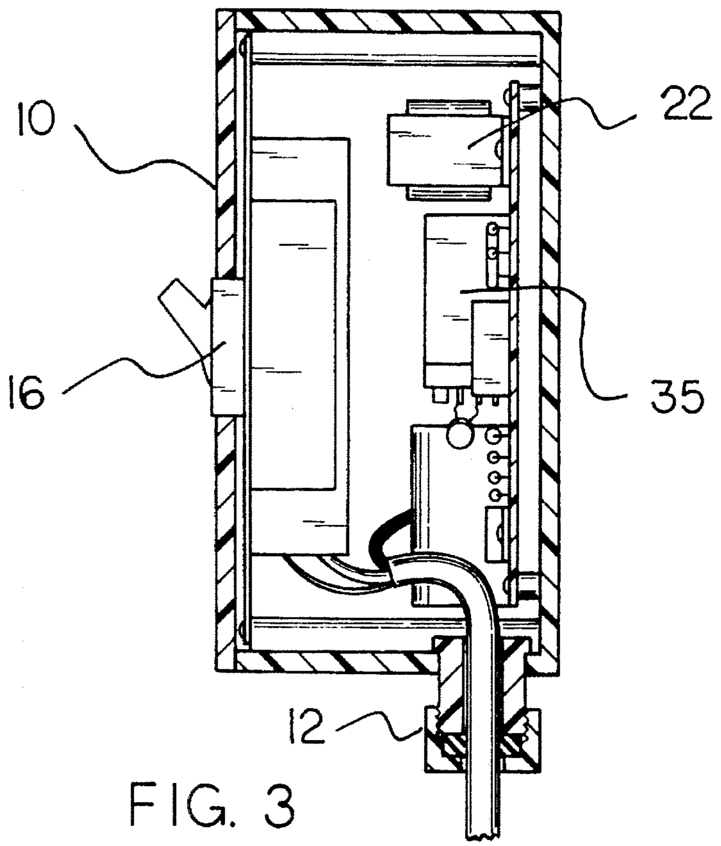
FIG. 3 is a cross-sectional view of the present invention taken along the line 3—3 of FIG. 2.

With switch 16 in the "off" or "Auto" position as shown in FIG. 2, the dust collection system or auxiliary device will operate only when the dust producing tool or machine is switched on. With 16 in the "on" or "Man" position, the dust collection system or auxiliary device will operate without the dust producing tool or machine being operated. Switch 16 has been included for convenience to the operator in order to perform final clean-up operation with the dust collection system independent of dust producing tool or machine usage.

Referring to FIG. 6, current is drawn by a power tool from the tool outlet 15A and passes through the primary coil 20. By the process of induction, a smaller but corresponding current is produced in the secondary coil 21. This current is rectified by the full wave rectifier 28, 29 and applied to the gate terminal of the MOSFET 34. Capacitors 30 and 31 smooth the fluctuations in output of 21 and raise it to peak. Resistors 32 and 33 provide a drain for 30 and 31 to prevent delayed shut-off.

At the same time, 120 volt line power is applied to transformer 22. The 12 VAC output of 22 is rectified by the full wave bridge rectifier 23, 24, 25, 26. Capacitor 27 raises the output of 22 to peak and smooths out ripple. The positive side of this DC potential is applied to the source terminal of transistor 34. The negative side is applied to and through the coil of relay 35 to the drain terminal of transistor 34. The positive voltage applied to the gate terminal of transistor 34 allows current flow from source to drain of and through the coil of relay 35, thereby closing its switching contacts. The 12 VDC is applied through the switching contact to the coil of relay 17. The contacts of relay 17 close and thus apply line power to accessory outlet 15B.

Figure 5:
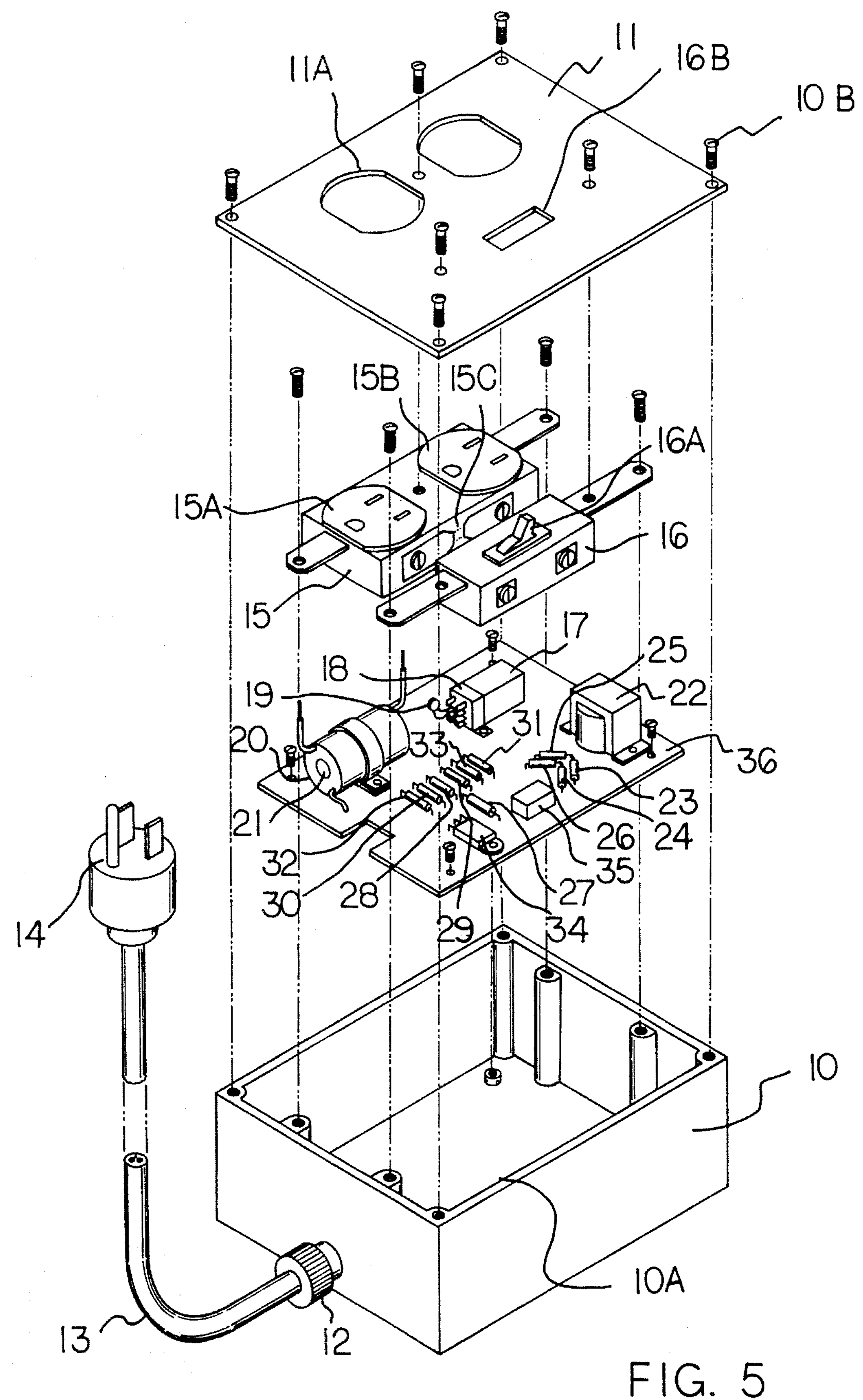
FIG. 5 is an exploded perspective view of the preferred embodiment of the present invention.

As best illustrated in FIG. 5, the present invention has been constructed using readily available parts and materials. The use of polyvinyl chloride plastic PVC type materials for the device box 10 and cover 11 adds durability and maximum electrical safety for the user. Device box 10 is a 2-gang device box also of the weatherproof type. Strain relief type box connector 12 is solvent welded into device box 10 and holds weatherproof jacketed electrical cord 13 in place. Cord 13 has a three-prong male grounding type electrical plug 14 affixed thereto. Common dual outlet receptacle 15 is supplied with outlet splitting tabs on both its neutral and hot sides. Such tabs are designed into common household outlets in order to provide one switched outlet and one non-switched outlet enclosed in the same dual outlet device box 11. Thus receptacle 15 is a dual electrical outlet which has been split into two independent outlets by removing the splitting tab 15C from the hot side thereof. These two independently functioning outlets are identified as the tool outlet 15A and the accessory outlet 15B.

A single pole single throw electrical switch 16 has been included as an added convenience to the user. Switch 16 can be operated in either of two positions. When switch 16 is in the "off" position, the accessory outlet 15B is energized only when a current drawing electrical tool or machine is connected to the tool outlet and switched into operation. This is, therefore, the "Auto" position of switch 16. When switch 16 is moved into the "on" position, an electric current drawing device which has been connected to the accessory outlet 15B can be operated manually and independently by the user. This function is useful for final clean up operations when a dust collection system is being used. This is, therefore, the "Man" position of 16.

Relay 17 is a 120 VAC relay with a 12 VDC coil. The contacts of 17 carry the current load of an auxiliary device or machine connected to 15B. Relay 17 is plugged into relay socket 18. Relay 17 could be installed without using socket 18. However, relay 17 could be damaged internally during soldering operations. Therefore, connections are made to 18. Relay 17 is then plugged into 18. Capacitor 19 reduces arcing of the contacts of 17 during load pickup and dropout. Coil 20 is made from #14 AWG electrical wire with THHN type insulation. This coil is constructed by wrapping the #14 AWG wire around a 2 inch or 12 mm diameter cylindrical rod or tube. The tube or rod is then removed from the coil of wire and discarded. Coil 21 is formed of #30 magnet wire wound around a steel core. This coil is not available commercially and must be custom fabricated. Coil 21 also has the added feature of being a split winding type. Two segments of wire are wound around a ⅛ inch×2¾ inch 3 mm×70 mm steel core. A small washer is used to divide these two segments. After completing the winding of the first segment, a length of the #30 AWG magnet wire of approximately 8 inches or 200 mm is drawn and doubled back onto the core before beginning the second segment of the coil. This doubled back length of wire provides the means of connection to the center of the coil.

Since the solid state components used in this invention require direct current at a lower electrical potential than the 120 VAC line, a source a step down transformer 22 and capacitor 27 have been added to smooth the 12 VDC output of rectifier 22, 23, 24, 25 and 26. Diodes 28 and 29 rectify the AC voltage from secondary coil 21. Capacitors 30 and 31 are connected in parallel with diodes 28 and 29 in order to obtain a peak value of the voltage induced into secondary coil 21. Resistors 32 and 33 provide drain circuits for capacitors 30 and 31 to prevent delayed shut off. Power MOSFET 34 has been chosen to isolate the gate voltage source from the source and drain circuit. A MOSFET has this unique characteristic. A 12 VDC single pole double throw relay 35 is provided. When transistor 34 is forced into conduction by the positive DC voltage applied to its gate, the normally open contacts of relay 35 close to supply power to the coil of relay 17. Outlets 15A and 15B are designed for a current load of 15 amperes each. However, the combined current load of a current drawing tool which is connected to 15A and a current drawing auxiliary device which is connected to 15B should not exceed 20 amperes total. The aforementioned electrical components of the electrical circuit are mounted on printed circuit board 36.

The present invention is easy to use, requires no special knowledge to operate, and provides safety and convenience to the user. This invention is inexpensive to construct and is reliable. This invention is electrically safe and will greatly improve the quality of a worker's environment. By virtue of its simplicity of use and convenience, this invention will provide incentive to workers to protect the environment from the hazards of ground, water, and air pollution. Although this invention in its presented form provides all of the above-mentioned benefits, it is by no means limited in its use or present configuration. Other uses could include the operation of pumps during washing or cleaning operations wherein hazardous chemicals should be contained and controlled. Exhaust fans might also be linked to hazardous vapor producing operations through use of the present invention. Almost any combination of tools and machines could be linked for simultaneous and automatic operation with this invention or a possible variation thereof. Although this invention in its present form is intended for portable and bench top use, a permanently installed variation linking many tools and machines is possible as well. Other modifications could include non-weatherproof indoor models and/or other variations with more or fewer outlets or other means of connection. The switch 16 could also be excluded but doing so would exclude an important feature of convenience to the user. There could also be many modifications made in the electronic circuits using other combinations which would yield similar results.

A parts list for the present invention is provided as follows:

Description, Manufacturer and Manufacturer Part Number, Source (10) 2-Gang weatherproof device box-PVC, Carlon* P/N E9802E, local electric supply
(11) Combination dual outlet/switch cover plate-PVC, Carlon* P/N E9G2DS, local electric supply
(12) Box connector-strain relief type-slip fit, Carlon, P/N H978E, local electric supply
(13) Power cord, SJ type, AWG 12/3 Conductor, 3 ft. (1 m), Non-specific, local electric supply
(14) Connector, 3 Prong Grounding Type, 120 V, 20 Amp, Non-specific, local electric supply
(15) Dual outlet-120 Volt/15 AMP, Non-specific, local electric supply
(16) Switch-SPST-120 Volt-15 AMP, Non-specific, local electric supply
(17) Relay-DPDT-12 VDC-10 AMP, Radio Shack P/N 275-218
(18) Relay Socket, Radio Shack P/N 275-220
(19) Capacitor-Metalized Film-1MFD-200 WVDC, Radio Shack P/N 272-1055
(20) Coil-14 AWG THHN-Approx. 60 Turns-½" (11 mm) Air, Core-1¼" (40 mm) Outside Diameter-2¾" (70 mm) Length, Self Manufactured, local electrical supply
(21) Coil-30 AWG Wire-Approx. 2000 Turns-⅛" (1.5 mm)Steel Rod Core-½" (12 mm) Outside Diameter-2¾" (70 mm) Length, Self Manufactured, use Radio Shack P/N 278-1345
(22) Transformer-120/12.6 V-300 mA, Radio Shack P/N 273-1385
(23,24,25,26,28,29) Diode-Silicon-1 KV-2.5 AMP Radio Shack P/N 276-1114
(27) Capacitor-4.7 uF-35 WVDC, Radio Shack P/N 271-1131
(30,31) Capacitor-10 MFD-35WVDC, Radio Shack P/N 272-1013
(32,33) Resistor-Carbon Film-56K-½W-5% Toll., Radio Shack P/N 272-1012
(34) Power MOSFET-IFR510-6 AMP, Radio Shack P/N 276-2072
(35) Relay-12 VDC-37.5 mA, Radio Shack P/N 275-241
(36) Printed Circuit Board Kit, Board dimensions 2"×3"(50 mm×72 mm), Radio Shack P/N 276-1576

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An electrical current actuated accessory outlet for allowing an electrical auxiliary device such as a shop vacuum to be operated simultaneously and automatically in connection with an electrical tool such a saw comprising, in combination:

a rigid device box having an open top and a cover removably secured over the top;

a sheathed power cable having a positive lead, a neutral lead, a proximal terminal end extended within the housing, and a distal three-pronged polarized grounded plug end extended from the housing and securable to a polarized grounded socket of an electrical receptacle of a remote electrical power source for receiving a source of alternating current therefrom; and an electric circuit disposed within the device box and with the electric circuit including:

a first power transformer having a primary coil and a secondary coil and with the primary coil thereof coupled to the positive lead of the power cable for receiving the source of alternating current, an electrical receptacle having a three-pronged polarized grounded accessory outlet and a three-pronged polarized grounded tool outlet with each outlet further extended outwards through the cover of the device box and with the accessory outlet mateable with a plug end of an electrical accessory device and the tool outlet mateable with a plug end of the electrical tool, the accessory outlet coupled to the neutral lead of the power cable and the tool outlet coupled to the primary coil of the first power transformer and the neutral lead of the power cable;

a first full wave rectifier formed of two diodes for transforming the source of alternating current into a first source of direct current, each diode of the first rectifier having a positive end and a neutral end and with the positive ends of the diodes coupled to the secondary coil of the first transformer and the neutral ends of the diodes coupled together at a common junction, each diode further having a resistor and a capacitor coupled in parallel therewith for mitigating fluctuations in the first source of direct current;

a second power transformer having a primary coil and a secondary coil and with the primary coil thereof coupled to the positive lead and the neutral lead of the power cable, a second full wave bridge rectifier formed of four interconnected diodes for transforming the source of alternating current into a second source of direct current and with the second rectifier having a capacitor coupled in parallel therewith for mitigating fluctuations in the second source of direct current, a first relay having a switching coil coupled to the second rectifier and a pair of switching contacts coupled between the positive lead of the power cable and the accessory outlet of the electrical receptacle and with the switching contacts of the first relay further having a capacitor coupled in parallel therewith for reducing current arcing during switching, a second relay having a switching coil coupled to the common junction of the second rectifier and a pair of switching contacts coupled between the switching coil thereof and the switching coil of the first relay, a power transistor having a gate terminal coupled to the common junction of the first wave rectifier, a drain terminal coupled to one of the switching contacts of the second relay, and a source terminal coupled to the switching coil of the first bridge rectifier, and a single pole single throw switch coupled in parallel with the switching contacts of the first relay and having a toggleable portion extended outwards from the cover of the device box, the switch having an open orientation for allowing the source of alternating current to be delivered to the tool that is plugged into the tool outlet and to thus cause the sources of direct current to flow through the transistor and effect closure the switching contacts of the first relay, thereby allowing delivery of the source of alternating current to the auxiliary device that is plugged into the accessory outlet, the switch further having a closed orientation for allowing the source of alternating current to be delivered to the accessory outlet for operation of the auxiliary device independently of the operation of the tool that is plugged into the tool outlet.

2. An electrical current actuated accessory outlet comprising:

power cable receiving means removably securable to a remote electrical power receptacle for receiving a source of alternating current therefrom; and an electric circuit including:

an electrical receptacle coupled to the power cable receiving means and having an accessory outlet and a tool outlet for delivering the source of alternating current, and power switching means coupled between the outlets of the receptacle and the power cable receiving means and with the power switching means having an activated mode for automatically allowing alternating current to be drawn from the auxiliary outlet by an auxiliary electrical device when alternating current is being drawn from the tool outlet by an electrical tool secured thereto.

3. The electrical current actuated accessory outlet as set forth in claim 2 and further comprising:

manually-operated switch means having one orientation for enabling the power switching means to be placed in the activated mode and further having another orientation for allowing alternating current to be drawn from each outlet independently of the other.

4. The electrical current actuated accessory outlet as set forth in claim 2 wherein the power switching means comprises:

a first power transformer for converting the source of alternating current to a first source of direct current;

a second power transformer for converting the source of alternating current to a second source of direct current;

relay means coupled to second power transformer and accessory outlet; and a power transistor coupled between the relay means, the first power transformer, and the second power transformer and with drawing of alternating current by the electrical tool secured within the tool outlet enabling the sources of direct current to flow through the power transistor and actuate the relay means to thus allow the source of alternating current to be drawn from the accessory outlet.

5. The electrical current actuated accessory outlet as set forth in claim 2 and further including a rigid device box encasing the electric circuit and with the device box having an opening and a cover removably secured over the opening.

* * * * *